(12) United States Patent
Mitsutake

(10) Patent No.: US 12,118,963 B2
(45) Date of Patent: Oct. 15, 2024

(54) DISPLAY CONTROLLER AND IMAGE DISPLAY METHOD

(71) Applicant: Sony Interactive Entertainment Inc., Tokyo (JP)

(72) Inventor: Masato Mitsutake, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 4 days.

(21) Appl. No.: 17/602,877

(22) PCT Filed: Mar. 26, 2020

(86) PCT No.: PCT/JP2020/013818
§ 371 (c)(1),
(2) Date: Oct. 11, 2021

(87) PCT Pub. No.: WO2020/213367
PCT Pub. Date: Oct. 22, 2020

(65) Prior Publication Data
US 2022/0165236 A1 May 26, 2022

(30) Foreign Application Priority Data
Apr. 16, 2019 (JP) .................................. 2019-077972

(51) Int. Cl.
*G09G 5/10* (2006.01)
*G09G 5/377* (2006.01)

(52) U.S. Cl.
CPC .............. *G09G 5/377* (2013.01); *G09G 5/10* (2013.01)

(58) Field of Classification Search
CPC ...... G09G 5/10; G09G 5/377; G09G 2340/10; G06T 15/503; G06T 2210/62; G06T 2207/20208; G06T 5/007
See application file for complete search history.

(56) References Cited

U.S. PATENT DOCUMENTS

| | | | |
|---|---|---|---|
| 9,672,603 B2 | 6/2017 | Koike | |
| 10,192,294 B2 | 1/2019 | Tsuru | |
| 11,006,834 B2 | 5/2021 | Takahashi | |
| 2008/0198170 A1 | 8/2008 | Guha | |
| 2012/0002899 A1* | 1/2012 | Orr, IV | H04N 23/6811 382/282 |

(Continued)

FOREIGN PATENT DOCUMENTS

| | | |
|---|---|---|
| JP | 11143441 A | 5/1999 |
| JP | 2001239053 A | 9/2001 |

(Continued)

OTHER PUBLICATIONS

International Search Report for corresponding PCT Application No. PCT/JP2020/013818, 6 pages, dated Jun. 23, 2020.

*Primary Examiner* — Antonio A Caschera
(74) *Attorney, Agent, or Firm* — Matthew B. Dernier, Esq.

(57) ABSTRACT

A display controller reads, from frame buffers, data on a first image and a second image, and converts, with a conversion formula depending on the characteristics in terms of luminance of the data, the data to data in a blend space having common characteristics. Then, the display controller performs alpha blending on the converted data in the blend space, further converts the data to a space having characteristics suitable for a display, and outputs the resultant to the display.

9 Claims, 17 Drawing Sheets

(56) References Cited

U.S. PATENT DOCUMENTS

| | | | |
|---|---|---|---|
| 2015/0213586 A1 | 7/2015 | Koike | |
| 2016/0292834 A1 | 10/2016 | Tsuru | |
| 2016/0365065 A1* | 12/2016 | Wu | ........................ G09G 5/06 |
| 2018/0308269 A1* | 10/2018 | Baran | ...................... G06T 11/60 |
| 2019/0254525 A1 | 8/2019 | Takahashi | |
| 2020/0296323 A1 | 9/2020 | Endo | |

FOREIGN PATENT DOCUMENTS

| | | | | |
|---|---|---|---|---|
| JP | 2015141333 A | | 8/2015 | |
| JP | 2016058848 A | | 4/2016 | |
| JP | 2017182064 A | | 10/2017 | |
| WO | 2018055945 A1 | | 3/2018 | |
| WO | 2018088186 A1 | | 5/2018 | |
| WO | WO2018/088186 | * | 5/2018 | ............... A61B 5/16 |

* cited by examiner

FIG. 2
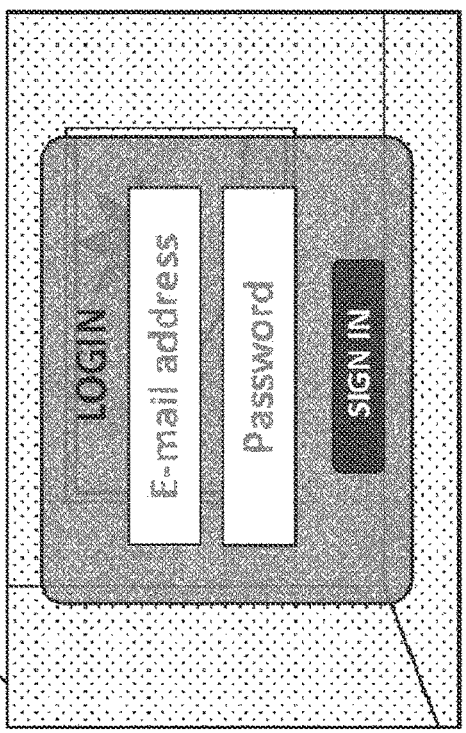
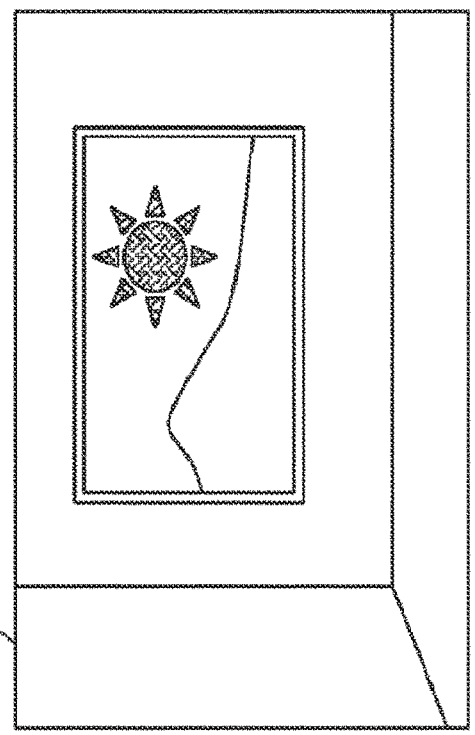
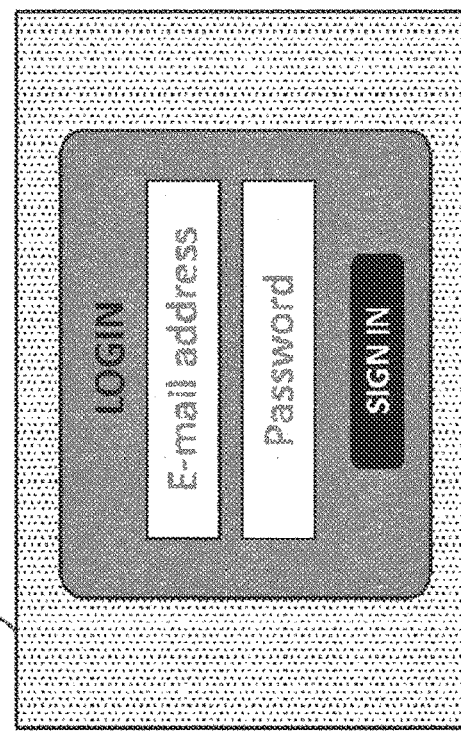

FIG. 6
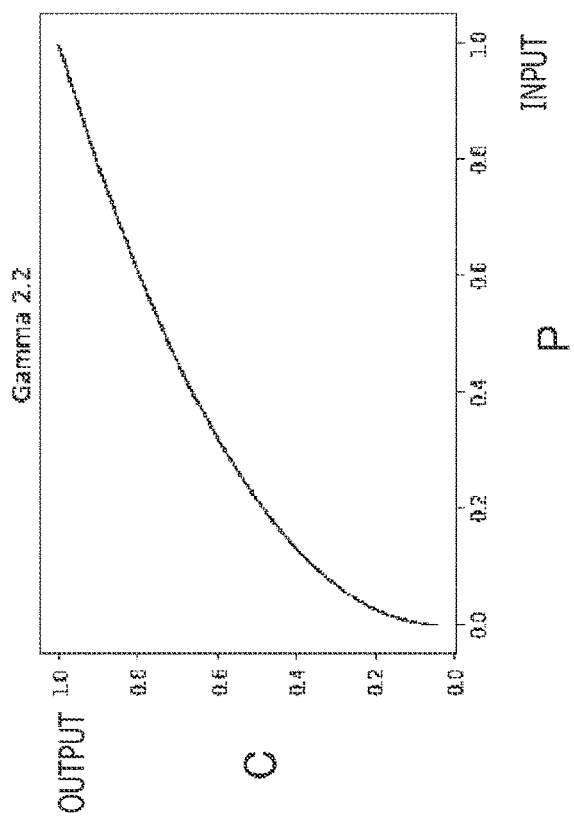
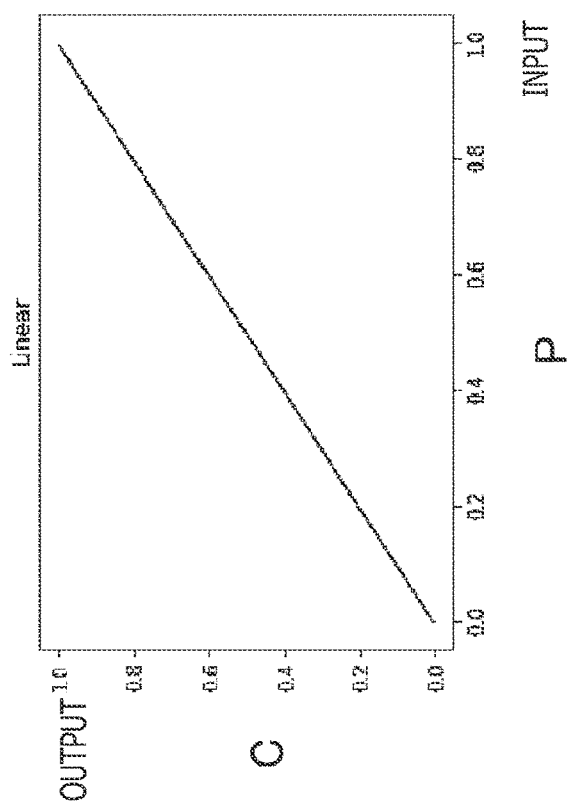

FIG. 7
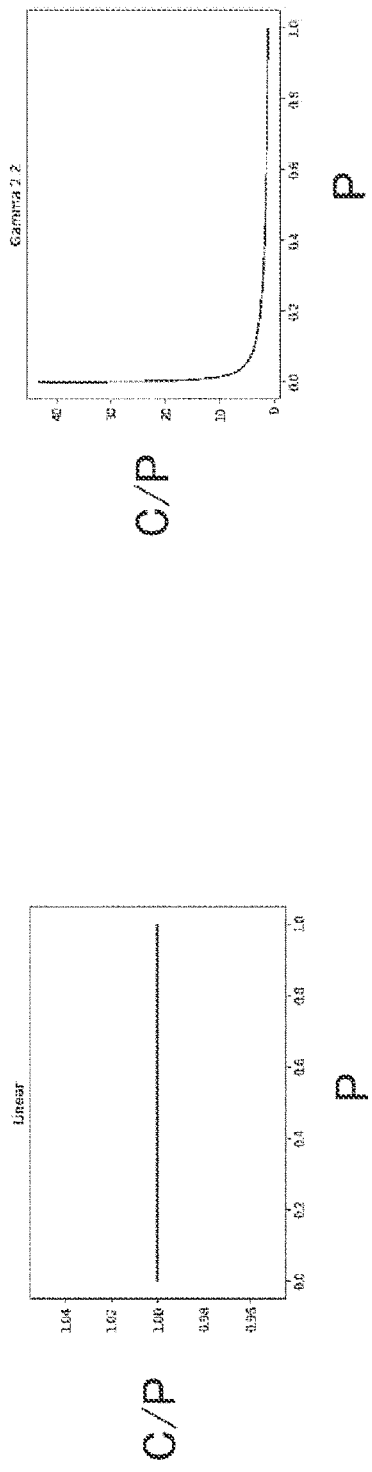
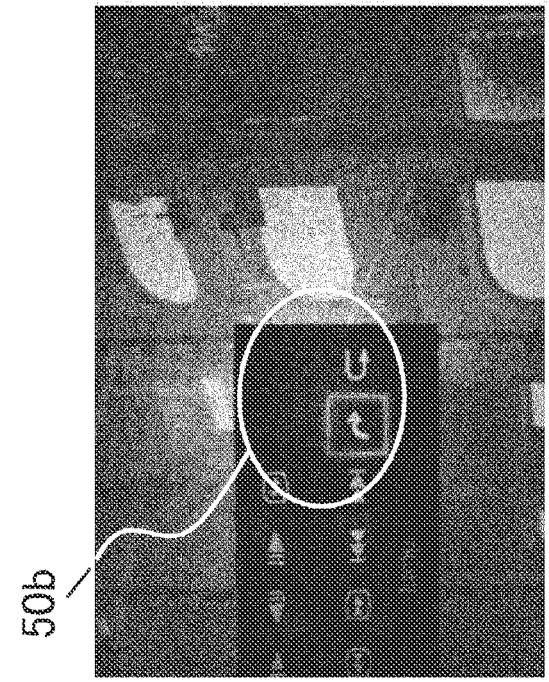
(b)
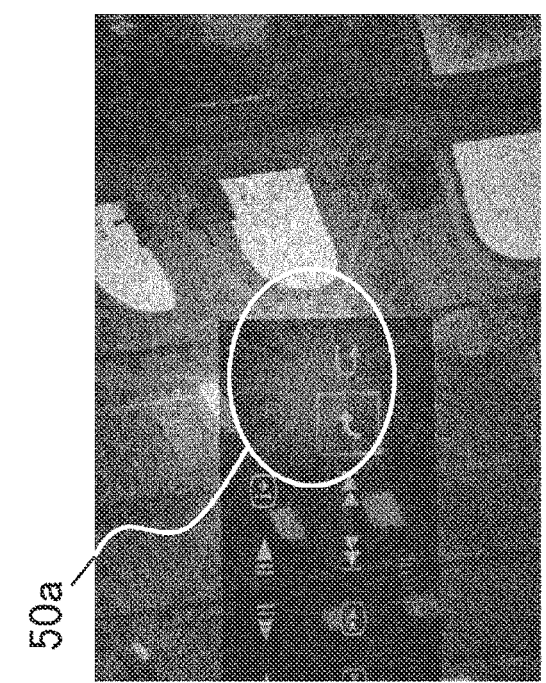
(a)

FIG. 11
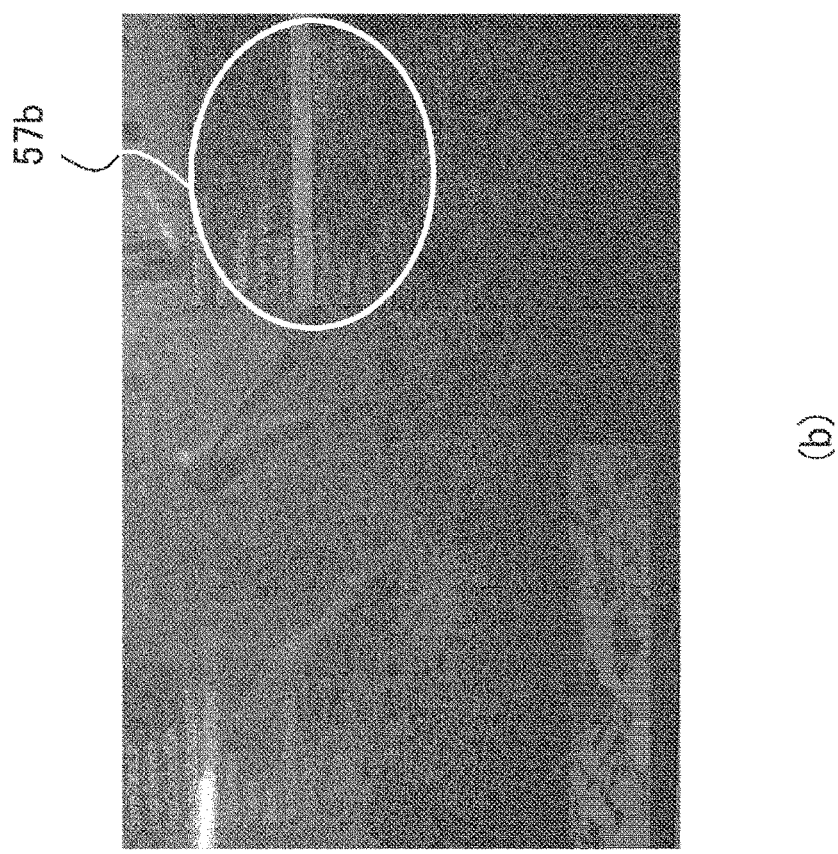
(b)
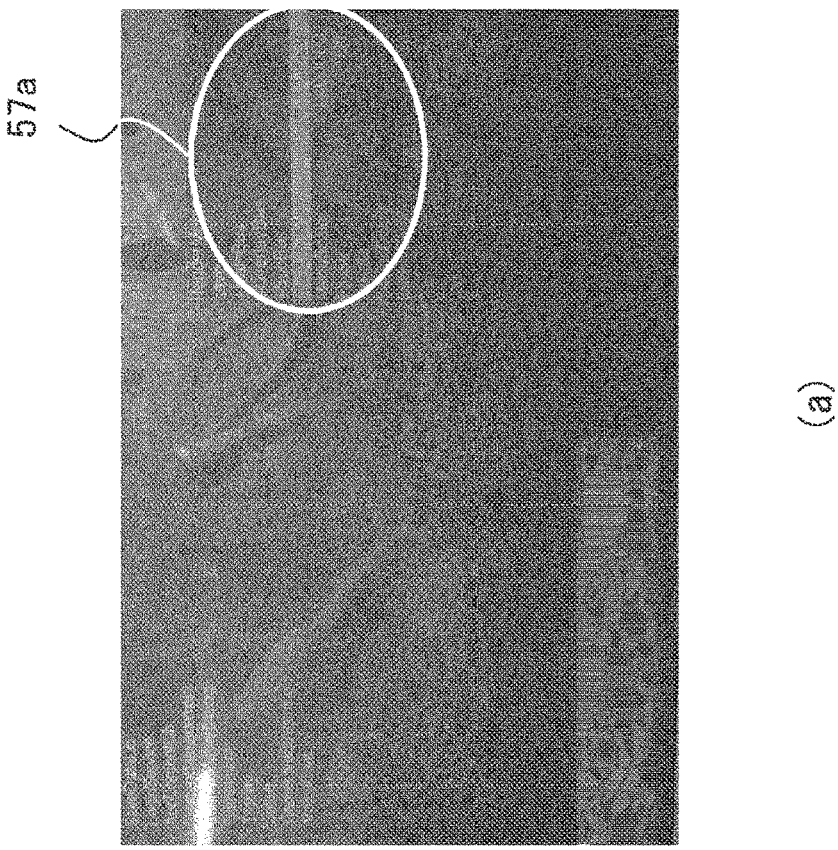
(a)

DISPLAY CONTROLLER AND IMAGE DISPLAY METHOD

TECHNICAL FIELD

The present invention relates to a display controller and an image display method for causing a display device to display images.

BACKGROUND ART

Hitherto, there have been developed various techniques for enhancing image quality of video display such as television broadcasting or distributed moving images. In recent years, in addition to techniques for enhancing resolution or color gamut, techniques for processing HDR (High Dynamic Range) signals in the expanded luminance range have been becoming popular. HDR is approximately one hundred times as large as SDR (Standard Dynamic Range) in the related art in luminance allowable range. Thus, dazzling objects in the real world such as the reflected light of sunlight can be represented more realistically even on images. Not only in television broadcasting or distributed moving images, but also in computer graphics worlds such as game images, more immersive virtual worlds are given through HDR representation (for example, see PTL 1).

CITATION LIST

Patent Literature

[PTL 1] Japanese Patent Laid-open No. 2016-58848

SUMMARY

Technical Problem

There are various combinations of conditions such as a luminance range that defines original image data and a luminance range that a connected display supports, so that more complex processing is required for image display. In particular, in a case where a plurality of images are combined to be displayed, different composite results are obtained depending on a change in conditions as described above, with the result that an image not originally intended to be displayed is displayed in some cases.

The present invention has been made in view of such a problem and has an object to provide a technique for achieving appropriate control of the composite result of a plurality of images, which are combined to be displayed, irrespective of conditions.

Solution to Problem

An aspect of the present invention relates to a display controller. The display controller includes a plurality of combining-use conversion circuits configured to convert a plurality of data on a plurality of images read from a memory to a plurality of data having a common characteristic in terms of luminance, a combining circuit configured to perform alpha blending on the data on the plurality of images having the common characteristic that has been output from the combining-use conversion circuits, and an output-use conversion circuit configured to output data on a composite image as a signal for display.

Another aspect of the present invention relates to an image display method. The image display method includes causing a display controller to execute the steps of converting data on a plurality of images read from a memory to data having a common characteristic in terms of luminance, performing alpha blending on the data on the plurality of images having the common characteristic, and outputting data on a composite image as a signal for display to a display.

Note that, any combinations of the above-mentioned components as well as modes obtained by converting the expressions of the present invention between a method, a device, a system, a computer program, a recording medium having recorded thereon a computer program, and the like are also effective as modes of the present invention.

Advantageous Effect of Invention

According to the present invention, the composite result of a plurality of images, which are combined to be displayed, can be appropriately controlled irrespective of conditions.

BRIEF DESCRIPTION OF DRAWINGS

FIG. 2 depicts diagrams schematically illustrating exemplary images that are generated by an information processing device according to the present embodiment.

FIG. 6 depicts diagrams exemplifying transfer functions that are used for quantizing pixel values of image data in the present embodiment.

FIG. 7 depicts diagrams illustrating a comparison between a composite image in a linear space and a composite image in a gamma space that are generated in the present embodiment.

FIG. 11 depicts diagrams exemplifying composite images obtained by the procedure of FIG. 10.

DESCRIPTION OF EMBODIMENT

Figure 1:
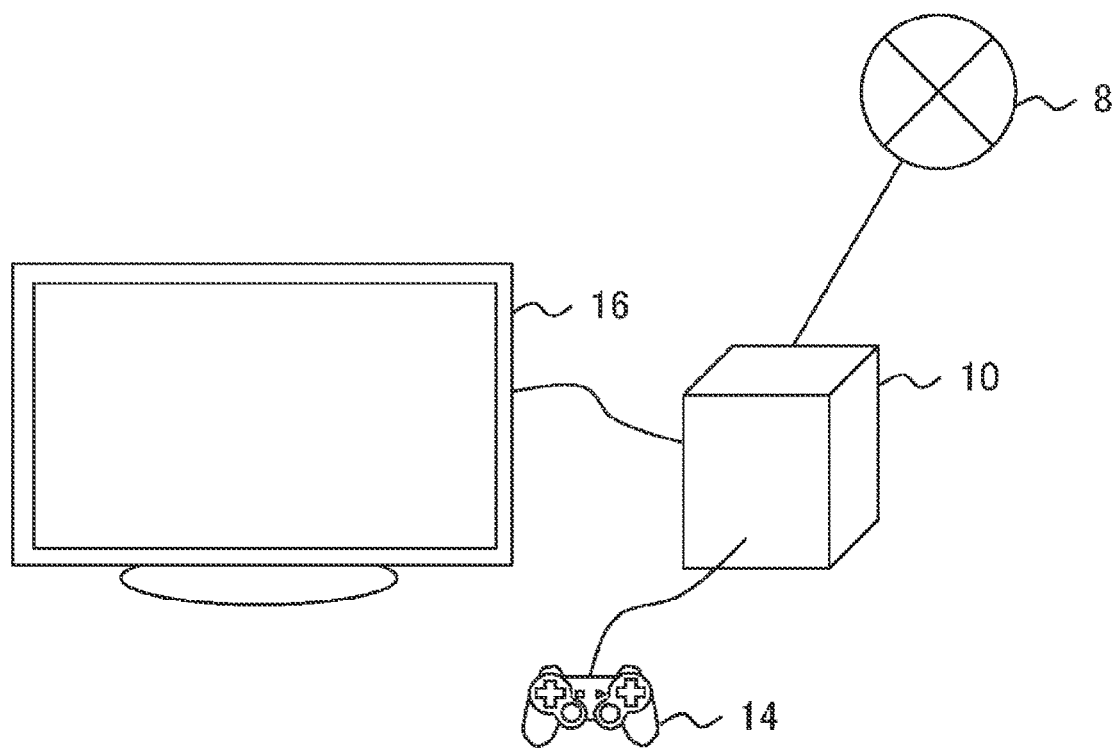
FIG. 1 is a diagram illustrating a configuration example of an information processing system according to the present embodiment.

FIG. 1 illustrates a configuration example of an information processing system according to the present embodiment. The information processing system includes an information processing device 10, an input device 14, and a display 16. As illustrated in FIG. 1, the information processing device 10 may be connected to, for example, a server configured to provide various types of content via a network 8 such as the Internet. The input device 14 may be a general user operatable input device, such as a controller, a keyboard, a mouse, a joystick, or a touch pad, an imaging device configured to capture the real world such as a user, a microphone configured to acquire sound, a sensor configured to detect various physical values, or a combination of any thereof.

The display 16 is implemented by, for example, a liquid crystal display, plasma display, or organic EL (electroluminescence) display configured to display images. Moreover, the display 16 may include a speaker configured to output sound. The input device 14 and the display 16 may be connected to the information processing device 10 with a cable or wirelessly through a wireless LAN (Local Area Network) or the like. Further, the appearance shapes of the input device 14, the display 16, and the information processing device 10 are not limited to those illustrated in FIG. 1. For example, two or more of those components may be integrally formed.

The information processing device 10 receives a signal based on the user's operation from the input device 14, performs processing based on the signal to generate data on a display image, and outputs the data to the display 16. The information processing device 10 may be any of a game console, a personal computer, a tablet terminal, a mobile terminal, a mobile phone, and the like. The processing details of the information processing device 10 may vary depending on the modes of the information processing device 10, applications selected by the user, or the like.

For example, the information processing device 10 causes an electronic game specified by the user, to progress, on the basis of the user's operation, generates game screen data at a predetermined frame rate, and outputs the data. Alternatively, the information processing device 10 may acquire moving image data from the server via the network 8 and decode and output the data sequentially. In this way, the information processing device 10 may be used for various purposes, and the details of information processing to be performed vary depending on usage purposes, so that a detailed description thereof is omitted. In the following, a method for preferably displaying content images generated as a result of such information processing, images representing information to be presented, or the like is described mainly.

FIG. 2 schematically illustrates exemplary images that are generated by the information processing device 10 according to the present embodiment. In this example, a main image 200a is an image that is displayed mainly, such as a game or moving image. An additional image 200b is an image that is displayed temporarily as needed and includes a dialog box for allowing the user to input an e-mail address and a password for a login in the example illustrated in FIG. 2. As the need of the display of such a dialog box arises, the information processing device 10 superimposes the additional image 200b including the dialog box on the main image 200a already displayed, thereby generating and outputting a display image 202.

At this time, the region of the main image 200a that is visible through the additional image 200b is set as wide as possible so that the necessary information can be preferably fused with little interference with the world of the main image 200a such as a game or moving image. Moreover, by changing the transparency of the additional image 200b over time, an effect in which the dialog box gradually appears or disappears can be provided.

It should be understood by those skilled in the art that, as the case in which a plurality of images are superimposed to be displayed, various cases are considerable other than the example illustrated in FIG. 2. For example, in the case of a racing game, it is conceivable that an additional image depicting an entire course seen from a bird's-eye view is additionally displayed on a main image depicting the field of view of a driver. In the case of displaying a movie, it is conceivable that an image depicting bibliographic information including the summary, the casts, or the like, or an operation panel including play, pause, fast forward, and the like is additionally displayed.

In a case where the display image 202 is generated, a color value $C_{out}$ of each pixel of the display image 202 can be determined using a calculation with alpha blending represented by the following formula.

$$C_{out}=(1-\alpha)C_1+\alpha C_2 \quad \text{(Formula 1)}$$

Here, $C_1$ represents the color value of a corresponding pixel of the main image 200a, $C_2$ represents the color value of a corresponding pixel of the additional image 200b, and a is a general a value that is set for the pixel of the additional image 200b, namely, a value equal to or larger than 0 but equal to or smaller than 1.0 indicating transparency.

For example, when the a value is changed from 0 to 1.0 in the entire image, from a state in which only the main image 200a is displayed, the colors of the additional image 200b are gradually deepened and the opaque additional image 200b is eventually displayed. When the a value is set to an intermediate value larger than 0 and smaller than 1.0, the additional image 200b is translucent at a level based on the numerical value but the main image 200 is seen through the additional image 200b.

Note that, when the main image 200a and the additional image 200b are RGB images, the color values $C_1$ and $C_2$ are set to each of the three channels, and in the present embodiment, those values are collectively referred to as "color values $C_1$ and $C_2$." Further, the color values $C_1$ and $C_2$ and the a value are each set in units of pixels, and thus depend on two-dimensional position coordinates (x, y) on the image plane in a precise sense. In Formula 1, however, a calculation for pixels at the same position is assumed, so that the position coordinates are not described. The same holds true for the following.

Figure 3:
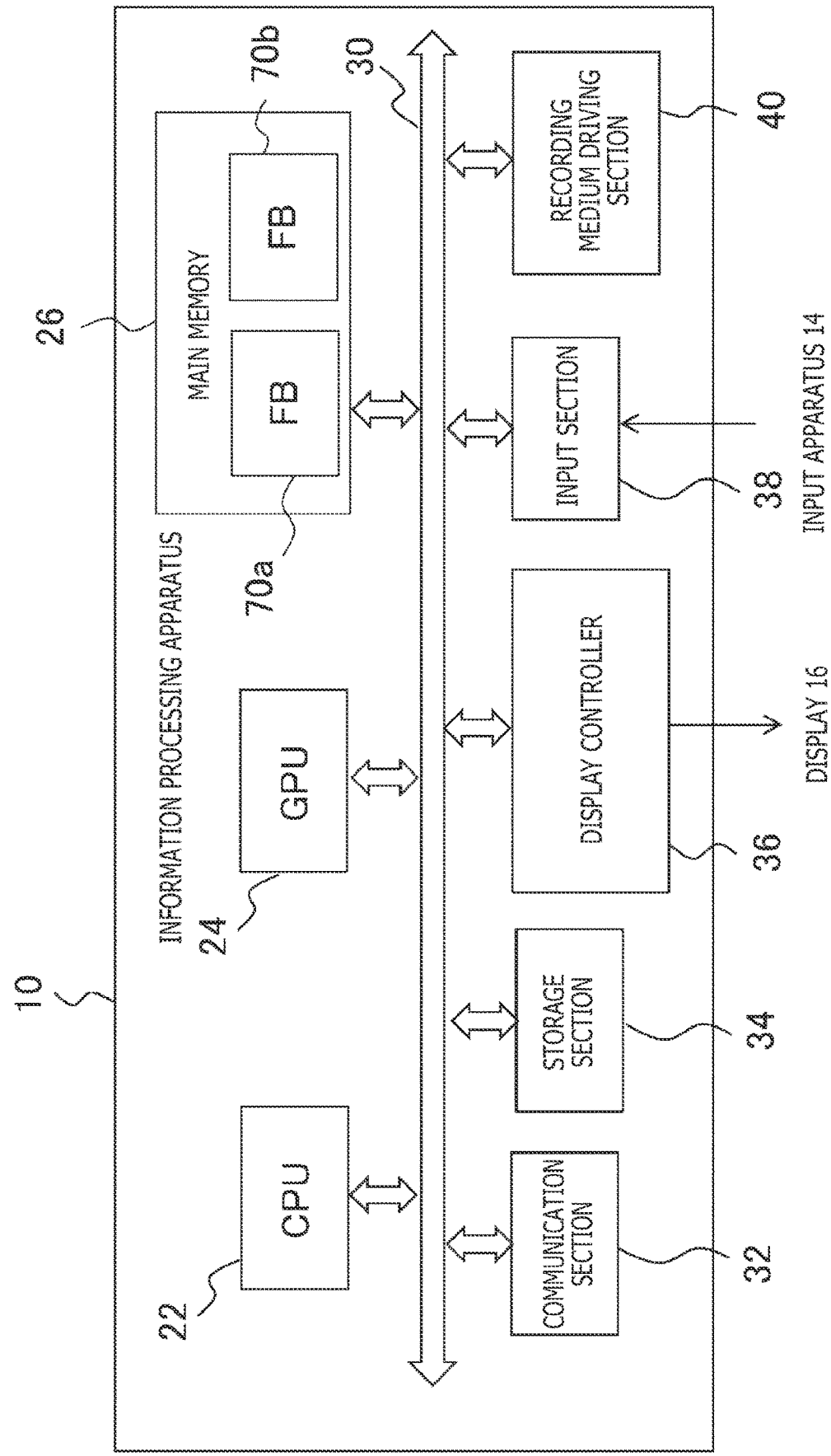
FIG. 3 is a diagram illustrating an internal circuit configuration of the information processing device according to the present embodiment.

FIG. 3 illustrates the internal circuit configuration of the information processing device 10. The information processing device 10 includes a CPU (Central Processing Unit) 22, a GPU (Graphics Processing Unit) 24, and a main memory 26. These sections are connected to each other via a bus 30. The bus 30 is also connected to a peripheral equipment interface such as a USB (Universal Serial Bus) or an IEEE (Institute of Electrical and Electronic Engineers) 1394, a communication section 32 including a network interface of a wired or wireless LAN to be connected to the network 8 or the like, a storage section 34 such as a hard disk drive or a nonvolatile memory, a display controller 36 configured to output video signals to the display 16, an input section 38 configured to receive data input from the input device 14, and a recording medium driving section 40 configured to drive a removable recording medium such as a magnetic disk, an optical disc, or a semiconductor memory.

The CPU 22 controls the entire information processing device 10 by executing an operating system stored in the storage section 34. The CPU 22 also executes various programs read from the removable recording medium to be loaded on the main memory 26 or downloaded via the communication section 32. Further, the communication section 32 may establish communication with an external device such as the server via the network 8, to thereby acquire data on electronic content such as moving images or transmit data generated in the information processing device 10.

The main memory 26 includes a RAM (Random Access Memory). The main memory 26 includes frame buffers 70a and 70b configured to store image data to be displayed. However, the number of frame buffers is not limited to any specific number. The image data to be stored includes an a plane in which the a value for alpha blending is represented on the image plane. The a value may be set in units of pixels or regions, or may be a fixed value for an entire image. Further, the set value may be changed over time. Further, the main memory 26 also stores programs or data necessary for processing.

The GPU 24 has a geometry engine function and a rendering processor function, and performs drawing processing in response to a drawing command from the CPU 22 and stores data on the image in the frame buffer 70a or 70b. The display controller 36 acquires data on images from the frame buffers 70a and the like, and outputs the data to the display 16 as a video signal at an appropriate timing. The display controller 36 also performs the image combining processing as described above, as needed.

Figure 4:
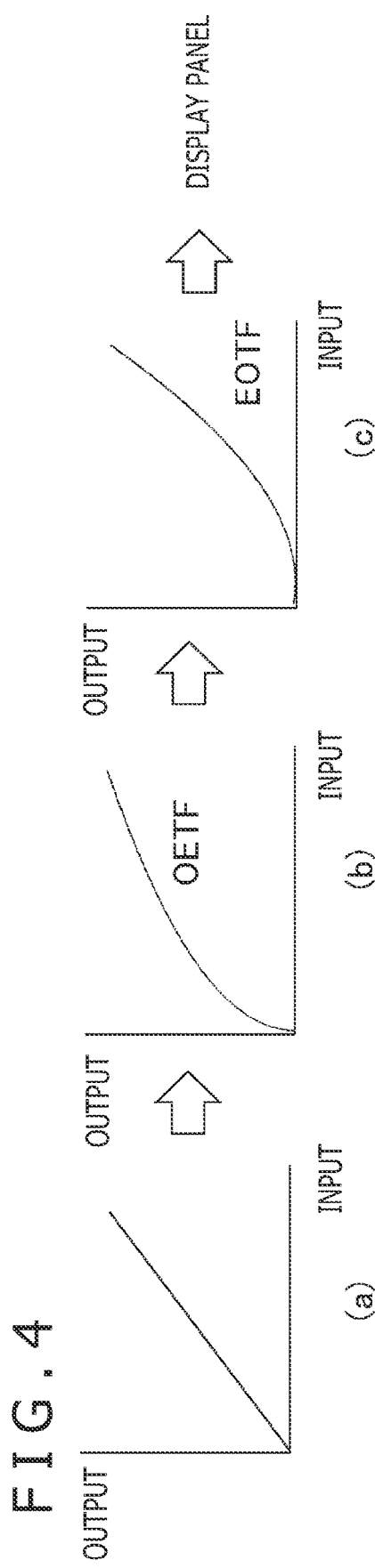
FIG. 4 depicts diagrams illustrating the flow of general video signal processing.

FIG. 4 is a diagram illustrating the flow of general video signal processing. Here, in (a), the input value is a pre-quantization pixel value of an image drawn by the GPU 24 or the like of the information processing device 10, and the output value is a color value supposed to be represented with the input value. The input value and the output value have a linear relation as a matter of course. Data having such linear characteristics is quantized with an OETF (optical-electro transfer function) as illustrated in (b) when the data is stored in the frame buffer 70a of the information processing device 10. By using different functions between images defined by the luminance range of SDR and images defined by the luminance range of HDR, an SDR or HDR video signal having a predetermined color depth is generated.

The display controller 36 reads the video signal from the frame buffer 70a and supplies the video signal to the display 16. The display 16 converts the video signal to luminance values with an EOTF (electro-optical transfer function) as illustrated in (c). By appropriately selecting the EOTF, from signals having the same color depth, luminance values in different ranges, namely, a range of from 0 to 100 nits for SDR images and a range of from 0 to 10,000 nits for HDR images, for example, are obtained in units of pixels. The luminance values are further corrected on the basis of the luminance characteristics of the display panel to be sequentially output at appropriate timing, so that the images are displayed in the corresponding luminance range.

Figure 5:
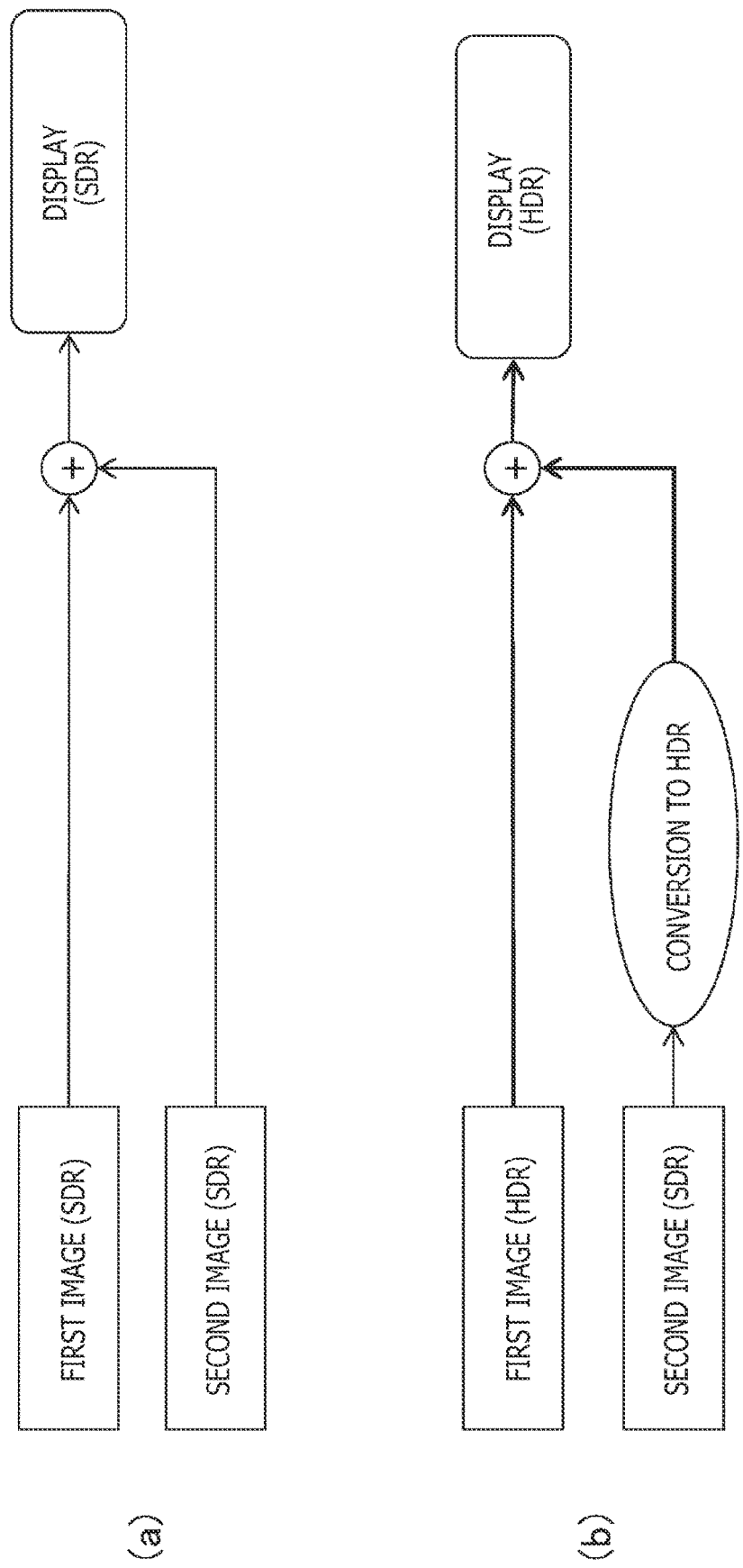
FIG. 5 depicts diagrams illustrating exemplary processing that is performed by a display controller to read images from two frame buffers, perform alpha blending, and output the resultant to a display.

FIG. 5 illustrates exemplary processing that is performed by the display controller 36 to read a first image and a second image from the two frame buffers 70a and 70b, perform alpha blending in units of pixels, and output the resultant to the display 16. Here, the first image and the second image correspond to the main image 200a and the additional image 200b of FIG. 2, respectively, and it is assumed that the luminance range of the second image is fixed to SDR. Further, the pixel values of each image are generally quantized to values in a range of from 0 to 1.0. Here, (a) illustrates a case where a display configured to support the luminance range of SDR is connected and the first image is generated in SDR. In this case, the display controller 36 can substitute the values of the corresponding pixels of the images into Formula 1 as they are to acquire the color values of the composite image, and output the color values to the display 16.

Further, (b) illustrates a case where a display configured to support the luminance range of HDR is connected and the first image is generated in HDR. Meanwhile, the second image is generated in SDR as described above. The display controller 36 accordingly converts the luminance range of the second image to values in HDR and substitutes the resultant into Formula 1, to thereby acquire the color values of the composite image. The luminance range conversion from SDR to HDR is achieved by mapping the luminance range of SDR to a part of the luminance range of HDR. For example, the peak luminance of SDR (1.0) is associated with a brightness of approximately 260 nits, and values of from 0 to 1.0 in SDR are mapped in a range of from 0 to 260 nits in HDR. However, the brightness to be associated is not limited to any particular brightness.

In (b), a signal represented in the luminance range of HDR is indicated by the thick line, and a signal represented in the luminance range of SDR is indicated by the thin line. However, the display controller 36 reads values quantized with the OETF described above so that when two images to be combined are converted with different OETFs, the composite result is affected by the conversion. This may occur irrespective of whether the luminance range is SDR or HDR. The principle of this is described below.

FIG. 6 exemplifies transfer functions that are used for quantizing the pixel values of image data. Here, (a) is a linear transfer function for determining a quantized color value C that is in direct proportion to a pixel value P of an original image. A relation "C=P" holds when values before and after conversion are normalized. The space of color values quantized with such a function is hereinafter referred to as a "linear space." Further, (b) is a gamma curve of γ=2.2 that has a relation "$C=P^{(1/2.2)}$." The space of color values quantized with such a function is hereinafter referred to as a "gamma space."

Formula 1 generally assumes the pixel value P but a similar result is obtained by combining, with Formula 1, color values in the linear space converted with the linear formula illustrated in (a). Meanwhile, the characteristics of the color value C of images converted with the nonlinear function illustrated in (b) are changed depending on the range of the pixel value P. Such nonlinear conversion affects combining using Formula 1.

FIG. 7 illustrates a comparison between a composite image in the linear space and a composite image in the gamma space. Here, (a) is the composite result of two images represented in the linear space as illustrated in (a) of FIG. 6, and (b) is the composite result of two images represented in the gamma space as illustrated in (b) of FIG. 6. As illustrated in the upper parts of the images, the ratio C/P of the color value C to the original pixel value P is 1.0 in any pixel value range in the case of (a), but the ratio takes a larger value for the smaller pixel value P in the case of (b). Thus, in the case of combining with Formula 1, an image including a dark image has a substantially large weight, and a bright image to be combined to the image in question has a substantially small weight.

For example, regions 50a and 50b in which the scattered light region of the first image depicting a certain scene and the dark region of the second image, which is a system menu, for example, are combined in a translucent manner are compared to each other. The first image is seen through the second image in the case of (a) but is hardly seen in the case of (b). As described above, (a) is similar to the composite result of the original pixel P, but which one of (a) and (b) is preferred depends on applications. For example, the weaker the visual stimulus, the higher the sensitivity of a person to a change in luminance, and hence nonlinear conversion may have a good affinity in terms of vision.

Further, in a case where images generated with different conversion formulae are combined, the composite results may have more various differences. Accordingly, the display controller 36 of the present embodiment converts the color values of images to be combined which are stored in the frame buffers 70a and 70b to values in a common space and then combines the images. The common space here can be specified by an application so that any of the composite images illustrated in (a) and (b) of FIG. 7 can be intentionally displayed. A common space that color values converted for combining have is referred to as a "blend space."

Figure 8:
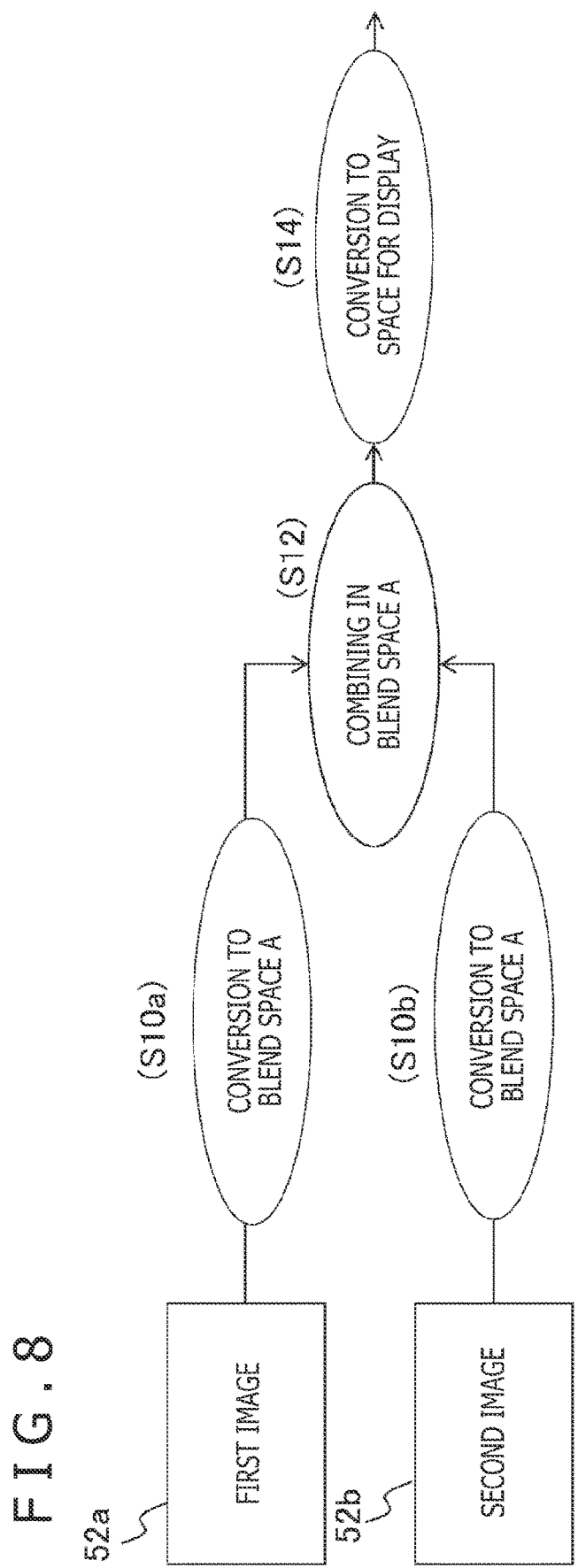
FIG. 8 is a diagram illustrating a procedure of processing that is performed by the display controller according to the present embodiment to combine two images and output the resultant.

FIG. 8 illustrates the procedure of processing that is performed by the display controller 36 of the present embodiment to combine two images and output the resultant. First, the frame buffer 70a and the frame buffer 70b have stored therein data on a first image 52a and data on a second image 52b, respectively. The data indicates the color value C converted or quantized with any conversion formula as exemplified in FIG. 6. The display controller 36 converts the data to data in a common blend space A (S10a and S10b).

Here, the blend space "A" is, for example, the linear space illustrated in (a) of FIG. 6 or the gamma space illustrated in (b) of FIG. 6. In a case where the original images stored in the frame buffers 70a and 70b are nonlinear data obtained by conversion with the OETF illustrated in FIG. 4, the nonlinear characteristics of the data are eliminated once, that is, the data is returned to have color values having linear changes to the pixel values (luminance), and then the data is converted to the common blend space. The processing of eliminating the characteristics is qualitatively equivalent to the conversion with the EOTF illustrated in FIG. 4. With this, the color values proportional to the output luminance of the display panel are obtained.

In a case where the original images stored in the frame buffers 70a and 70b are linear data illustrated in (a) of FIG. 4, the data is converted to nonlinear data with the OETF illustrated in FIG. 4 to be converted with the EOTF, and is then converted to the common blend space. This is because the conversion with the EOTF is generally not inverse to the conversion with the OETF, and hence (a) of FIG. 4 is different from the color values proportional to the output luminance of the display panel.

When the blend space "A" is the linear space, the color value C (linear) proportional to the output luminance of the display panel can be converted to the color value C (blend space) in the blend space by the following calculation.

$$C(\text{blend space}) = C(\text{linear}) \quad \text{(Formula 2)}$$

When the blend space "A" is the gamma space, the color value C (linear) can be converted to the color value C (blend space) by the following calculation.

$$C(\text{blend space}) = (C(\text{linear}))^{(1/\gamma)} \quad \text{(Formula 3)}$$

That is, the color value C (gamma space) in the gamma space and the color value C (linear space) in the linear space can be converted to each other by the following calculations.

$$C(\text{gamma space}) = (C(\text{linear space}))^{(1/\gamma)} \quad \text{(Formula 4)}$$

$$C(\text{linear space}) = (C(\text{gamma space}))^{\gamma} \quad \text{(Formula 5)}$$

The display controller 36 acquires, from the CPU 22, information regarding a blend space specified by an application being executed, and switches between the conversion formulae depending on the information. Then, the display controller 36 combines the two images converted to the common blend space A in units of pixels with Formula 1 (S12). With this, the composite result can be appropriately controlled.

The display controller 36 further converts the composite result to a space suitable for the display 16 (S14). That is, the display controller 36 obtains, from the blend space, the color values proportional to the output luminance of the display panel, and performs inverse conversion with the EOTF illustrated in FIG. 4 on the color values, to thereby obtain data corresponding to the output of the conversion with the OETF. The display controller 36 supplies the thus converted color values to the display 16. The display 16 can therefore display the image by similar processing irrespective of whether the image is a composite image or not.

Figure 9:
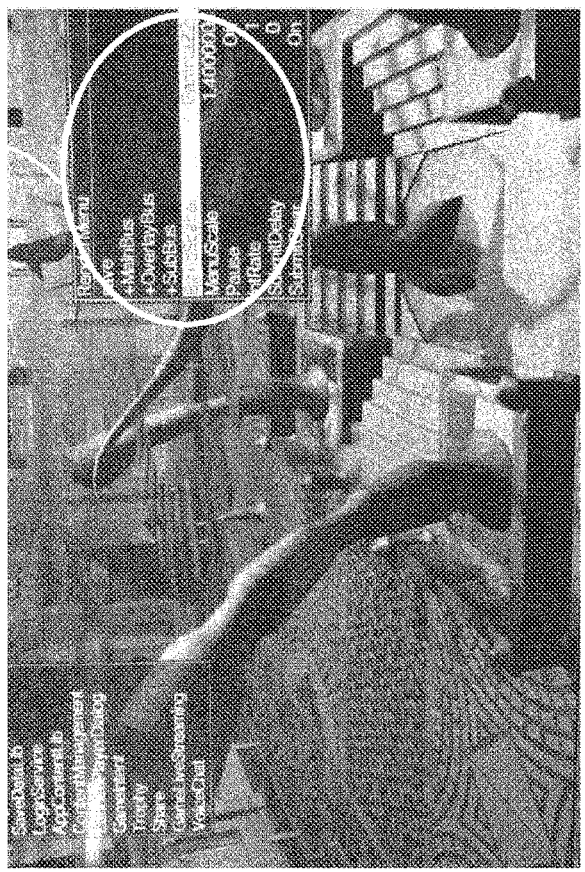
FIG. 9 is a diagram exemplifying composite images obtained by the procedure of FIG. 8.

FIG. 9 exemplifies composite images obtained by the procedure of FIG. 8. Here, (a) illustrates the composite image in the case where the blend space is the linear space, and (b) illustrates the composite image in the case where the blend space is the gamma space having γ=2.2. Regions 54a and 54b in which the first image and the second image are combined in a translucent manner are considered. The first image is seen through the second image in the region 54a of the image obtained by combining in the linear space but is hardly seen in the region 54b of the image obtained by combining in the gamma space due to the deep black color of the second image. In this way, irrespective of the color values of the space stored in the frame buffers 70a and 70b, the composite result can be preferably controlled by specifying the blend space.

Figure 10:
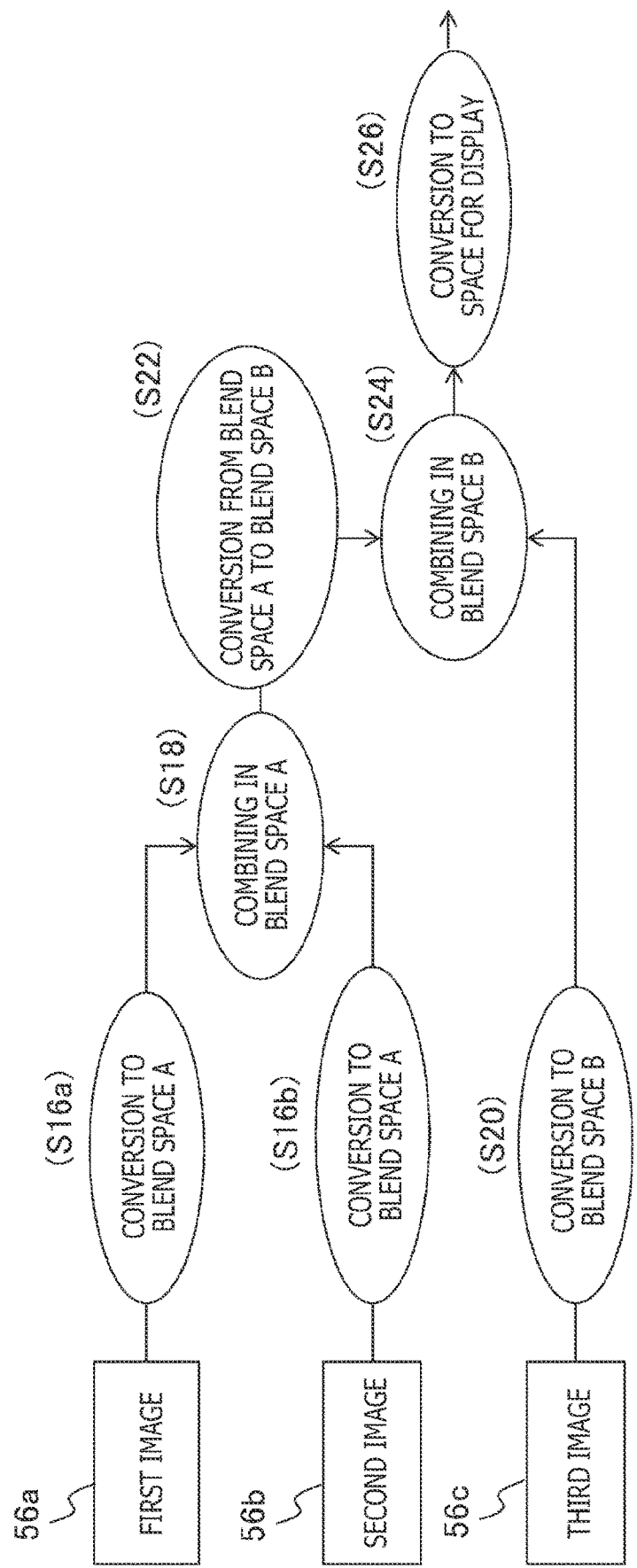
FIG. 10 is a diagram exemplifying the procedure of processing that is performed by the display controller according to the present embodiment to combine three images and output the resultant.

FIG. 10 exemplifies the procedure of processing that is performed by the display controller 36 of the present embodiment to combine three images and output the resultant. Three frame buffers including the frame buffer 70a have stored therein respective first image 56a, second image 56b, and third image 56c. Of those, the first image 56a and the second image 56b are images generated by an application, and the third image 56c is an image provided from, for example, a system independent of the application. In this case, the first image 56a and the second image 56b generated by the application are combined in a blend space specified by the application as in the procedure of FIG. 8.

That is, the display controller 36 converts these images to data in the common blend space A (S16a and S16b), and then combines the images in units of pixels with Formula 1 (S18). With this, the composite image intended by a developer of the application is generated. Meanwhile, it is desired that even when blend space specification by an application has a degree of freedom, an image provided by the system is not affected by the change. Accordingly, as illustrated in FIG. 10, the third image 56c is converted to data in an individual blend space B. When the blend space B is different from the blend space A of the application image, the display controller 36 further performs conversion to make the application image and the third image 56c be in the same blend space.

That is, the display controller 36 converts the third image 56c to the blend space B (S20), and converts the image data obtained by the combining in S18 from the blend space A to the blend space B (S22). Then, the display controller 36 combines the composite image by the application and the third image 56c (S24). The conversion from the blend space A to the blend space B can also be calculated with any of Formulae 2 to 5 descried above. The display controller 36 further converts the composite image obtained in the blend space B to the space suitable for the display 16 (S26), and outputs the resultant.

FIG. 11 exemplifies composite images obtained by the procedure of FIG. 10. Here, (a) and (b) illustrate images obtained by superimposing a separately generated translucent filled image on the composite images illustrated in (a) and (b) of FIG. 9. The images seen through the superimposed translucent image are the same as the images of (a) and (b) of FIG. 9. That is, when regions 57a and 57b in which the first image and the second image are combined in a translucent manner are considered, the first image is seen through the second image in combining in the linear space illustrated in (a) but is hardly seen in the gamma space illustrated in (b). Moreover, in (a) and (b), the entire images are seen through the additionally superimposed entirely translucent third image at almost the same level. In this way, by selectively using the plurality of blend spaces depending on cases, while the representation by the application has a degree of freedom, the composite image that does not affect the system image can be generated.

Figure 12:
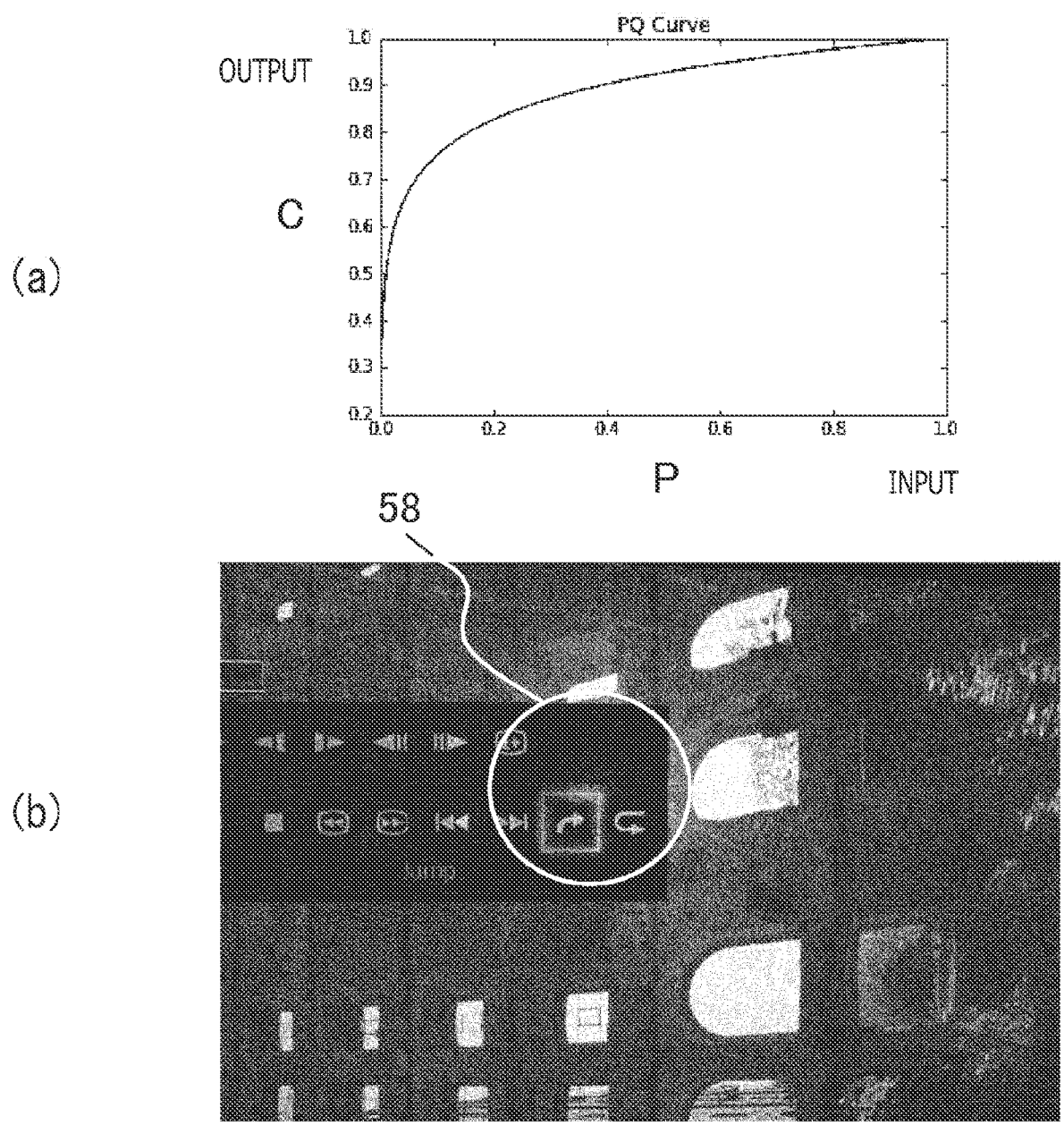
FIG. 12 depicts diagrams illustrating the characteristics of a conversion formula that is used for HDR images in the present embodiment, and the composite result of images converted with the conversion formula.

Considering a difference in luminance range between original images such as SDR and HDR, more various conversion formulae are conceivable. FIG. 12 illustrates the characteristics of a conversion formula that is used for HDR images and the composite result of images converted with the conversion formula. As illustrated in (a), HDR is generally quantized with a function called PQ (Perceptual Quantization) curve. The PQ curve has a larger rate of increase in color value in the low luminance region than the gamma curve. Thus, when images subjected to such conversion are combined, as illustrated in (b), the second image is more dominant than in the composite result illustrated in (b) of FIG. 7, and the first image is not seen through the second image (for example, region 58).

Thus, as in the above, the characteristics of data converted with the PQ curve are eliminated once, and then the data is converted to a blend space or the like specified by an application to be subjected to the combining processing. Moreover, as described above, depending on a luminance range that a display supports, there is a need of the conversion of HDR images to the luminance range of SDR or the conversion of SDR images to the luminance range of HDR.

Figure 13:
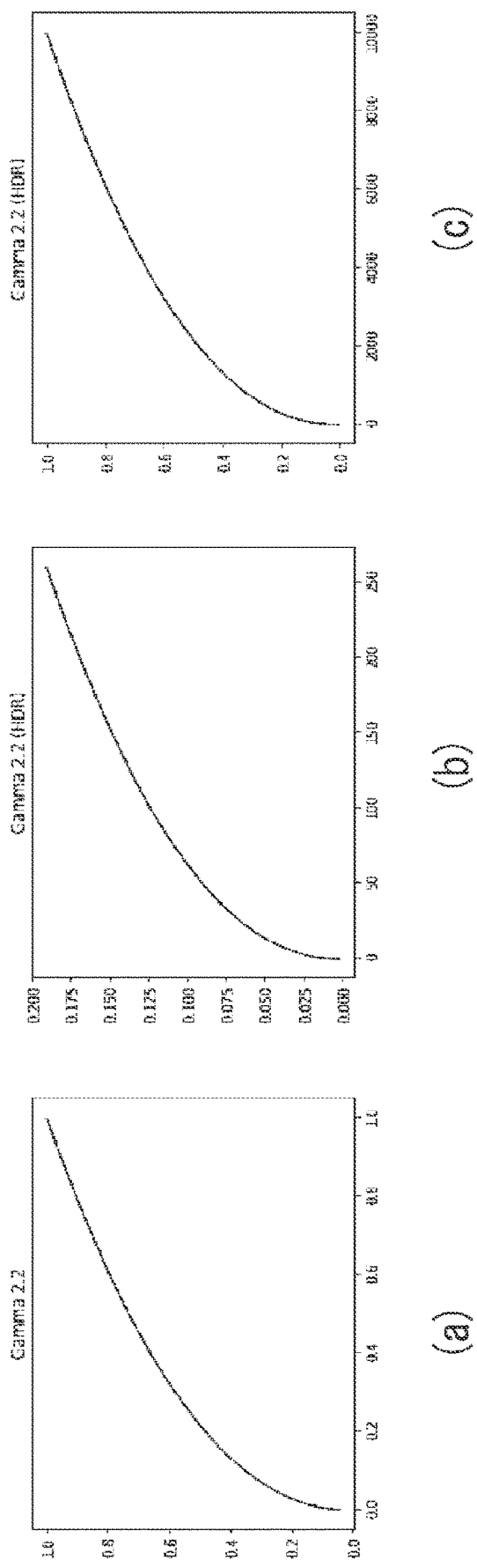
FIG. 13 depicts diagrams illustrating a comparison between the characteristics of the gamma space in various luminance ranges.

FIG. 13 illustrates a comparison between the characteristics of the gamma space in various luminance ranges. Note that, $\gamma=2.2$ holds. Here, (a) illustrates a case where an SDR image is converted to the gamma space, (b) illustrates a case where an SDR image converted to the luminance range of HDR is converted to the gamma space, and (c) illustrates the characteristics of an HDR image when the HDR image is converted to the gamma space. For example, by mapping a luminance of from 0 to 260 nits on the horizontal axis of (c) in association with a luminance of from 0 to 1.0 in SDR, the pixel values of the SDR image can be converted to values in the luminance range of HDR. The horizontal axis of (b) indicates luminance obtained by such conversion.

In all the cases illustrated in FIG. 13, the behavior of the color values after the conversion to the color values before the conversion is the same. This means that as long as the gamma space is used as the blend space, whether the luminance range is converted or not does not affect color values after the conversion, that is, a change in weight of an image due to substitution into Formula 1 does not occur. As a result, even when the luminance range is converted, color values after combining can be appropriately controlled. Also in the case where the blend space is the linear space, the luminance range conversion does not affect composite results as a matter of course. Thus, as illustrated in FIG. 5, except for the conversion of an original image luminance range to a luminance range that the display supports, the combining processing in the blend space described so far is applicable as it is.

Figure 14:
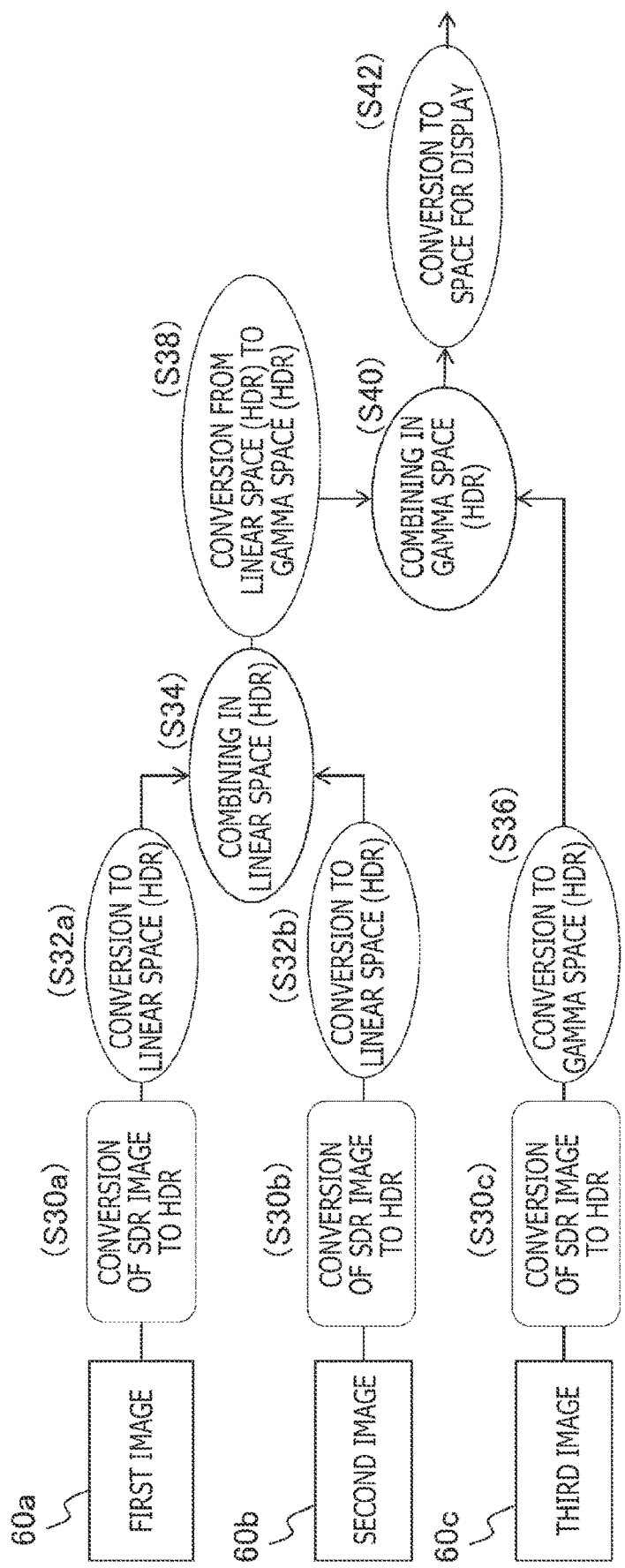
FIG. 14 is a diagram exemplifying the procedure of processing that is performed by the display controller according to the present embodiment to control an HDR display to display a composite image.

FIG. 14 exemplifies the procedure of processing that is performed by the display controller 36 of the present embodiment to control the HDR display 16 to display a composite image. In this example, the three frame buffers including the frame buffer 70a have stored therein respective first image 60a, second image 60b, and third image 60c. Of those, the first image 60a and the second image 60b are images generated by an application, and the third image 60c is an image provided from, for example, a system independent of the application. The luminance range of each image may be SDR or HDR.

When detecting that the connected display 16 supports HDR, the display controller 36 converts, of these images stored in the frame buffers, the SDR images to images in the luminance range of HDR (S30a, S30b, and S30c). There is no need of the conversion of HDR images as a matter of course. The display controller 36 further converts the first image 60a and the second image 60b to data in a blend space specified by the application (S32a and S32b). The display controller 36 combines the images in units of pixels with Formula 1 thereafter (S34). In the example illustrated in FIG. 14, the linear space is specified by the application such that the composite image is data in the linear space.

Meanwhile, the display controller 36 converts the third image 60c that is subject to further combining to data in a blend space set to the system (S36). In the example illustrated in FIG. 14, the third image 60c is converted to data in the gamma space. In this case, the composite image generated in S34 and the third image 60c are in the different spaces, so that the composite image is converted from the linear space to the gamma space (S38), and then the images are combined (S40). The display controller 36 further converts the composite image obtained in the gamma space to the space suitable for the display (S42), and outputs the resultant.

In a case where an original image is an HDR image, which has been subjected to conversion with the PQ curve, to eliminate the characteristics of the data once and give characteristics in a blend space to the data, the following formula is used in the case where the blend space is the linear space.

$$C(\text{blend space}) = PQ\_EOTF(C(PQ)) \quad \text{(Formula 6)}$$

The following formula is used in the case where the blend space is the gamma space.

$$C(\text{blend space}) = PQ\_EOTF(C(PQ))^{(1/\gamma)} \quad \text{(Formula 7)}$$

Here, C(PQ) is a color value obtained by conversion with the PQ curve, and PQ_EOTF that corresponds to the EOTF of FIG. 4 is a function for obtaining a luminance value from a signal quantized with the PQ curve. The display controller 36 performs space conversion by selecting appropriate one of Formulae 2 to 7 depending on whether an original image is in HDR or SDR, or when the original image is in SDR, on whether the conversion formula applied to the original image is the linear or gamma curve and the blend space is the linear space or the gamma space.

Figure 15:
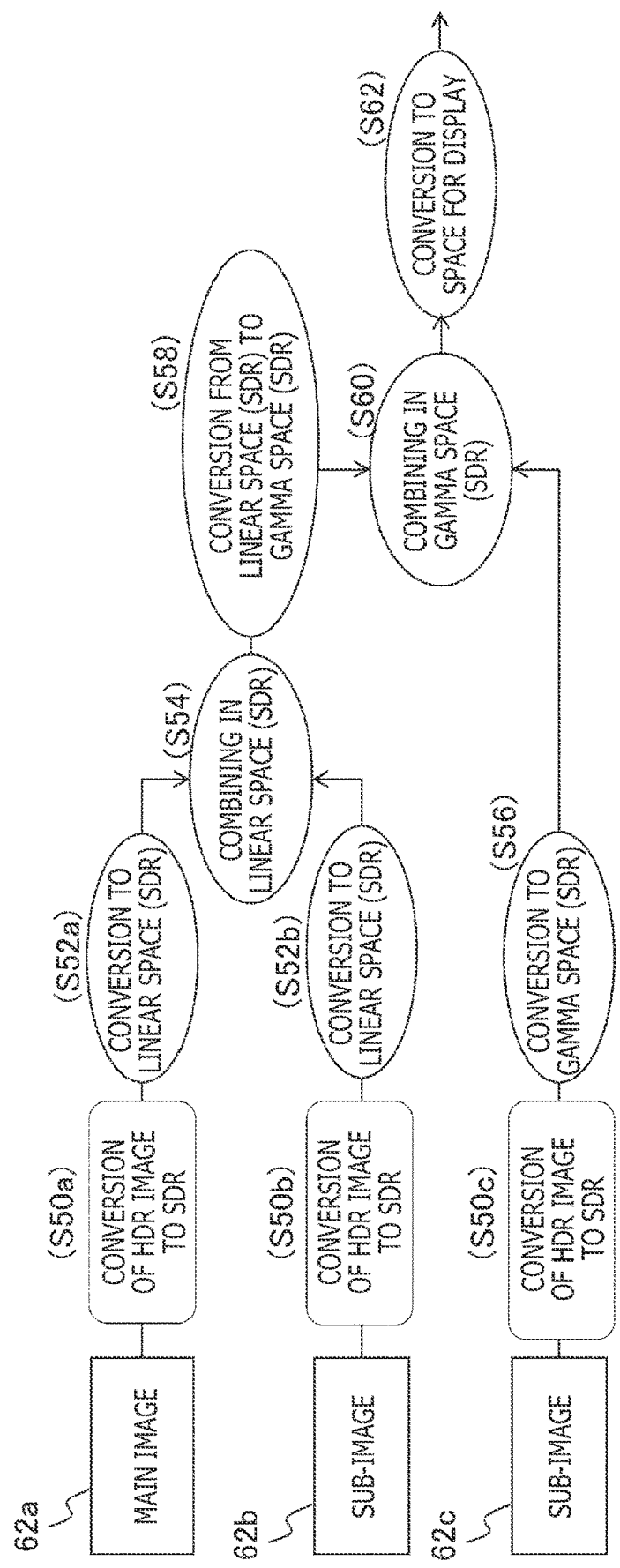
FIG. 15 is a diagram exemplifying the procedure of processing that is performed by the display controller according to the present embodiment to control an SDR display to display a composite image.

FIG. 15 exemplifies the procedure of processing that is performed by the display controller 36 of the present embodiment to control an SDR display to display a composite image. As in FIG. 14, the frame buffer 70a and the like have stored therein respective first image 62a, second image 62b, and third image 62c. Of those, the first image 62a and the second image 62b are images generated by an application, and the third image 62c is an image provided from, for example, a system. The luminance range of each image is not limited to any particular range.

When detecting that the connected display 16 supports SDR, the display controller 36 converts, of these images stored in the frame buffers, the HDR images to values in the luminance range of SDR (S50a, S50b, and S50c). Then, the display controller 36 converts the first image 62a and the second image 62b to data in a space specified by the application, which is the linear space in the example illustrated in FIG. 15 (S52a and S52b). The display controller 36 combines the images in units of pixels with Formula 1 thereafter (S54).

Meanwhile, the display controller 36 converts the third image 62c that is subject to further combining to a blend space set to the system, which is the gamma space in the example illustrated in FIG. 15 (S56). Also in this example, the composite image generated in S54 and the third image 62c are in the different spaces, so that the composite image is converted from the linear space to the gamma space (S58), and then the images are combined (S60). The display controller 36 further converts the composite image obtained in the gamma space to the space suitable for the display (S62), and outputs the resultant.

When the procedures of FIG. 14 and FIG. 15 are compared to each other, it is found that the procedures may be similar to each other except for the luminance range conversion, which is performed as needed, and the formulae used for conversion to a blend space. The driver of the display controller 36 appropriately sets a conversion destination luminance range depending on the performance of the connected display 16, thereby achieving easy switching between the procedure of FIG. 14 and the procedure of FIG. 15. For example, even when the display 16 is changed to another display 16 that supports another luminance range while an electronic game is in progress, composite results can be displayed in the supported luminance range without affecting the composite results themselves.

Note that, the blend spaces illustrated in FIG. 14 and FIG. 15 are merely exemplary, and may be changed depending on developers of applications, the settings of the system, or the like. Further, the conversion formulae used for quantizing SDR or HDR original images are not limited to the linear or gamma curve, or the PQ curve. Irrespective of conversion formulae, the conversion that is the subsequent processing is similar as long as the conversion formula achieves, using the EOTF, color values having a proportionate relation to the output luminance of the display. Moreover, when data is converted to a common blend space before combining, similar effects are obtained irrespective of the number of images to be combined.

Figure 16:
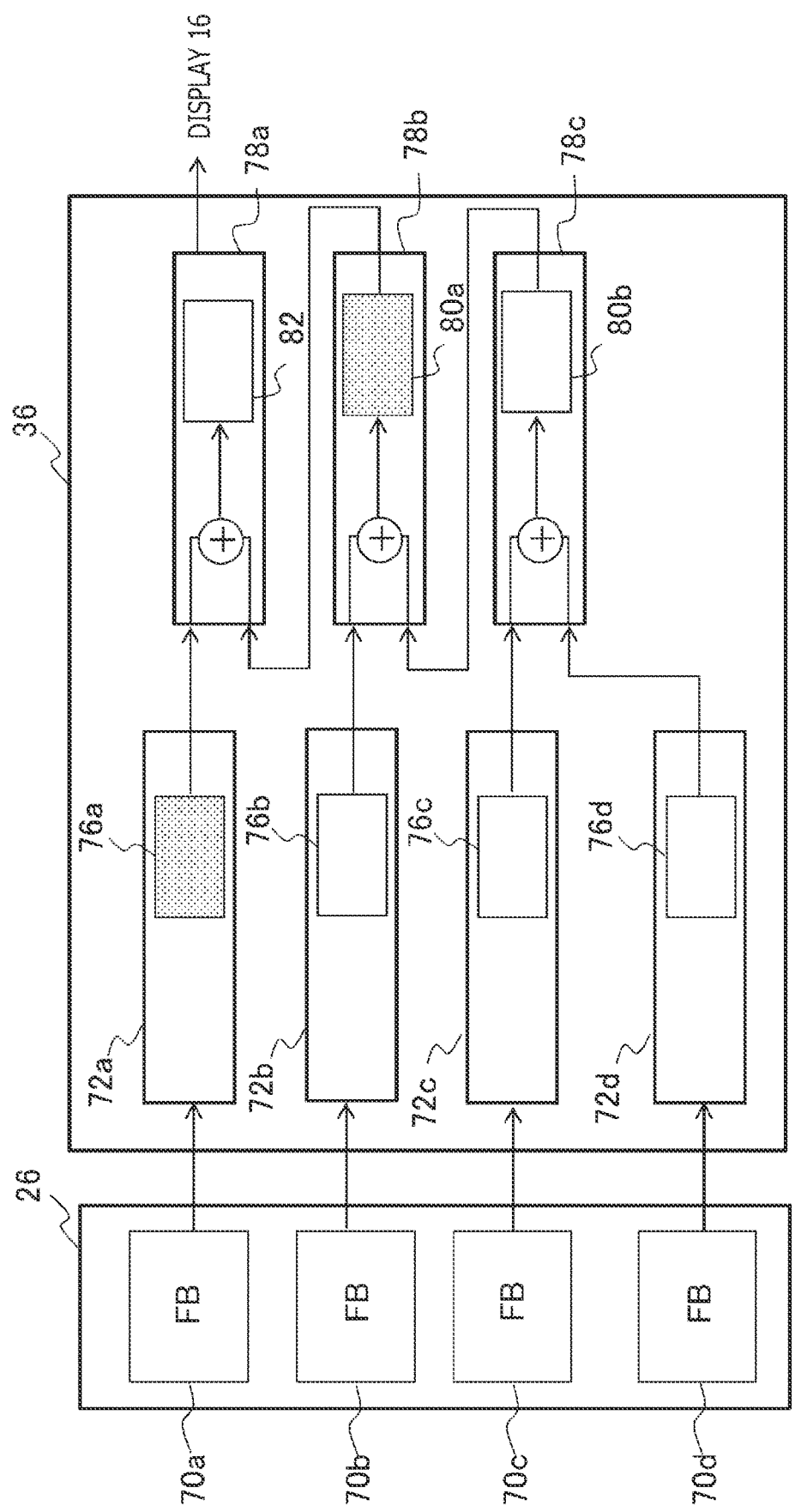
FIG. 16 is a diagram schematically illustrating the circuit configuration of the display controller according to the present embodiment.

FIG. 16 schematically illustrates the circuit configuration of the display controller 36 of the present embodiment. In the example illustrated in FIG. 16, the main memory 26 includes four frame buffers 70a, 70b, 70c, and 70d. Meanwhile, the display controller 36 includes luminance range converting circuits 72a, 72b, 72c, and 72d corresponding to the respective frame buffers 70a, 70b, 70c, and 70d, and combining circuits 78a, 78b, and 78c configured to sequentially add, with weighting, values output from the luminance range converting circuits. However, the number of luminance range converting circuits and combining circuits is not limited to any specific number.

The luminance range converting circuits 72a, 72b, 72c, and 72d read, from the respective frame buffers 70a, 70b, 70c, and 70d, image data in units of pixels, and convert, as needed, the values to values in a luminance range that the connected display 16 supports. Further, the luminance range converting circuits 72a, 72b, 72c, and 72d include combining-use conversion circuits 76a, 76b, 76c, and 76d, and convert color values converted to values in the luminance range of the display 16 to values in a predetermined blend space.

The combining circuit 78c adds, with weighting based on the a value, the color values of corresponding pixels output from the luminance range converting circuits 72d and 72c, to thereby calculate the color values of the composite image in a blend space. The combining circuit 78b adds, with weighting, the color values of pixels output from the luminance range converting circuit 72b, and the color values of the pixels of the composite image output from the combining circuit 78c on the former stage, to thereby calculate the color values of the composite image. The combining circuit 78a adds, with weighting, the color values of pixels output from the luminance range converting circuit 72a and the color values of the pixels of the composite image output from the combining circuit 78b on the former stage, to thereby calculate the color values of the composite image.

The combining circuit 78a sequentially outputs the thus obtained ultimate color values of the composite image to the display 16. Here, the combining circuits 78b and 78c include respective composite image converting circuits 80a and 80b, and each convert images obtained by conversion by the combining circuits themselves to a blend space for images to be combined on the latter stage. When a composite image is in the same blend space as images to combined on the latter stage, the processing by the composite image converting circuits 80a and 80b is omitted. In the example illustrated in FIG. 16, it is indicated by the unfilled rectangle that the composite image converting circuit 80b converts data to the same blend space as the combining-use conversion circuit 76b of the luminance range converting circuit 72b, and it is indicated by the shaded rectangle that the composite image converting circuit 80a converts data to the same blend space as the combining-use conversion circuit 76a of the luminance range converting circuit 72a.

Further, the combining circuit 78a includes an output-use conversion circuit 82 and converts the ultimate color values of the pixels of a composite image to values in the space suitable for output to the display 16. The combining-use conversion circuits 76a, 76b, 76c, and 76d, the composite image converting circuits 80a and 80b, and the output-use conversion circuit 82 refer to a look-up table, which is not illustrated, in terms of red, green, and blue values that are the color values of pixels, to thereby perform space conversion by general interpolation circuits. Further, conversion destination blend spaces and whether conversion is required or not in those circuits are controlled by the CPU 22.

Figure 17:
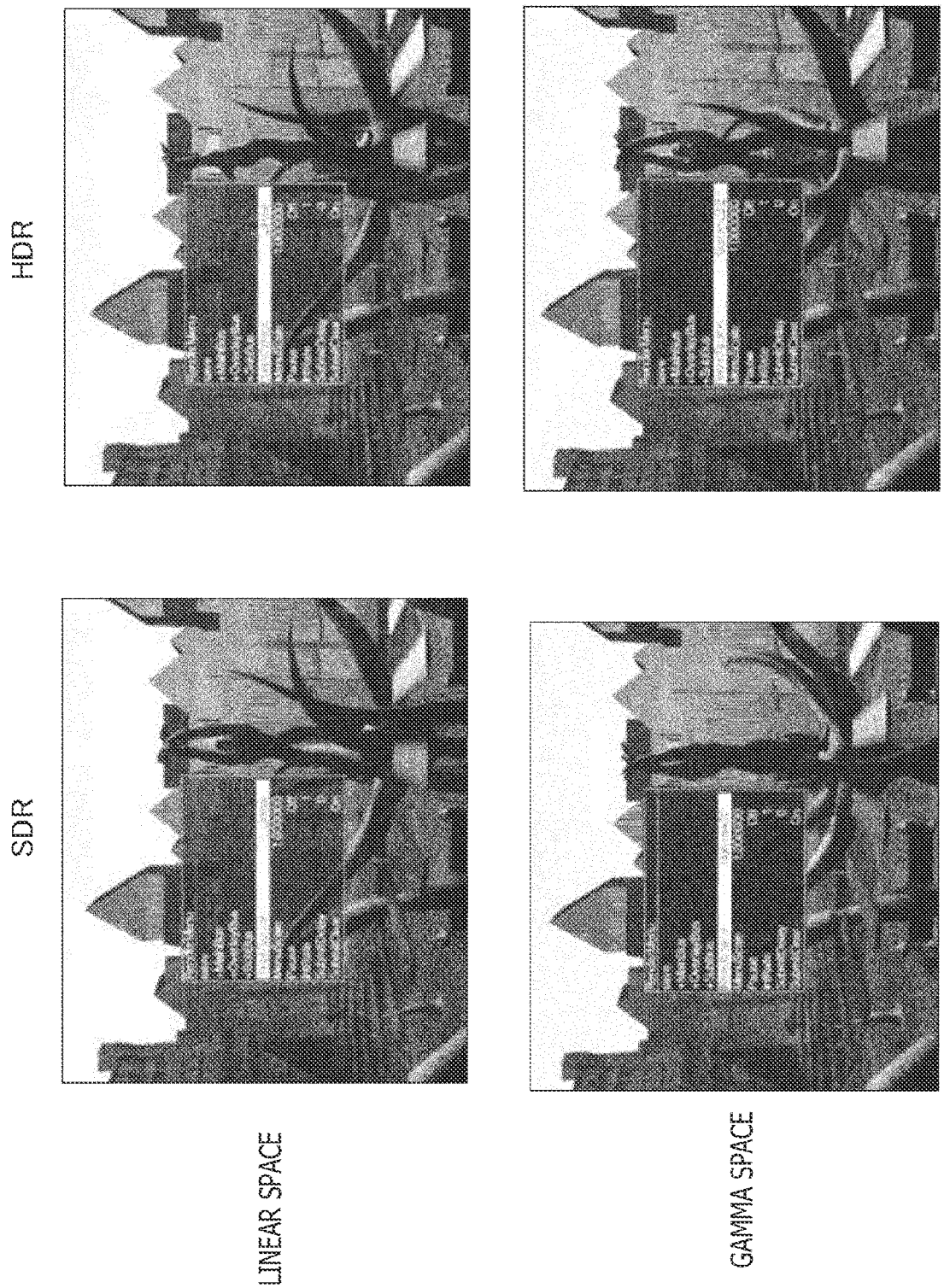
FIG. 17 depicts diagrams illustrating a comparison between composite images obtained in blend spaces of the linear space and the gamma space and displayed on the SDR and the HDR displays in the present embodiment.

FIG. 17 illustrates a comparison between composite images obtained in the blend spaces of the linear space and the gamma space and displayed on the SDR and HDR displays. When the central parts in which the first image and the second image are combined in a translucent manner are paid attention to, as described above, the composite results in the gamma space have a larger weight in dark region than the composite results in the linear space, with the result that the first image is less seen through the second image in this example. Meanwhile, it is found that the images combined in the same blend space have similar degrees of transparency in SDR display and HDR display. That is, by selecting the blend space, the degree of transparency can be preferably controlled irrespective of luminance range.

According to the present embodiment described above, when a plurality of images are combined by the display controller, the conversion characteristics used for quantization are eliminated once, and the data is given common characteristics for combining to be converted again. With this, it can be prevented that the balance of the pixel values of images to be combined is changed in calculation in general alpha blending due to factors other than the set α value, with the result that a composite image with an unintended degree of transparency is not displayed. Further, a combining space for the combining of images by an application can be specified by the application itself, and the thus obtained composite image is further converted to the space of a separately provided image such as a system image.

With this, images by an application can be more freely combined without affecting system images or the like to be displayed in a superimposed manner. Moreover, data is converted to a combining space after luminance range conversion between SDR and HDR by utilizing the fact that the characteristics themselves are unchanged before and after the luminance range conversion even with a nonlinear conversion formula. With this, even when a display having different performance is connected, composite images independent of the display performance can be stably displayed by easy switching. Combining that supports various conditions can be achieved by the hardware of the display controller such that developers of applications do not need to take various types of user environment into account.

In the above, the present invention has been described on the basis of the embodiment. It should be understood by those skilled in the art that the above-mentioned embodiment is exemplary so that the combinations of components or processing processes of the embodiment can be modified in various ways, and that such modified examples are also within the scope of the present invention.

INDUSTRIAL APPLICABILITY

As described above, the present invention is applicable to, for example, various devices, such as display controllers, display devices, content reproducing devices, and game consoles, and systems including such devices.

REFERENCE SIGNS LIST

8 Network, 10 Information processing device, 14 Input device, 16 Display, 22 CPU, 24 GPU, 26 Main memory, 36 Display controller, 38 Input section, 70a Frame buffer, 72a Luminance range converting circuit, 76a Combining-use conversion circuit, 78a Combining circuit, 80a Composite image converting circuit, 82 Output-use conversion circuit.

The invention claimed is:

1. A display controller, comprising:
   a plurality of combining-use conversion circuits configured to convert a plurality of data on a plurality of images read from a memory to a plurality of data having a common characteristic in terms of luminance, by mapping a luminance range of at least one of the images to a part of a luminance range of at least one other of the images;
   a combining circuit configured to perform alpha blending after the conversion on the data on the plurality of images having the common characteristic that has been output from the combining-use conversion circuits; and
   an output-use conversion circuit configured to output data on a composite image as a signal for display,
   wherein, prior to converting the plurality of data to the common characteristic in terms of luminance, the combining-use conversion circuits eliminate any nonlinear characteristic in the plurality of data for the plurality of images in terms of luminance, and thereafter, perform the converting the plurality of data on the plurality of images to the common characteristic in terms of luminance.

2. The display controller according to claim 1,
   wherein the combining circuit combines data on a composite image output from another combining circuit, and the data on one of the images output from the combining-use conversion circuits, and
   the other combining circuit includes a composite image converting circuit configured to convert the composite image to data having another characteristic in terms of luminance.

3. The display controller according to claim 1, wherein the combining-use conversion circuits convert, when the read data on the images includes data that is generated by an application, the data to data having the characteristic specified by the application.

4. The display controller according to claim 1, further comprising:
   a plurality of luminance range converting circuits configured to convert the data on the plurality of images to data in a luminance range that a display connected supports,
   wherein the combining-use conversion circuits convert the data on the images in the luminance range that the display supports to the data having the common characteristic.

5. The display controller according to claim 1, wherein the nonlinear characteristic in terms of luminance given to the plurality of data on the plurality of images is monitored in advance prior to converting the plurality of data on the plurality of images to the data having the common characteristic.

6. The display controller according to claim 1, wherein the combining-use conversion circuits convert, depending on a luminance range that defines the data on the images, the data with different conversion formulae.

7. The display controller according to claim 1, wherein the combining-use conversion circuits convert the data to data having, as the common characteristic, a linear characteristic or gamma characteristic in terms of luminance.

8. An image display method that is performed by a display controller, the image display method comprising:
   converting, via a plurality of combining-use conversion circuits, data on a plurality of images read from a memory to data having a common characteristic in terms of luminance, by mapping a luminance range of at least one of the images to a part of a luminance range of at least one other of the images;

performing, via a combining circuit, alpha blending after the conversion on the data on the plurality of images having the common characteristic that has been output from the combining-use conversion circuits; and outputting, via an output-use conversion circuit, data on a composite image as a signal for display to a display, wherein, prior to converting the plurality of data to the common characteristic in terms of luminance, the converting by the combining-use conversion circuits includes eliminating any nonlinear characteristic in the plurality of data for the plurality of images in terms of luminance, and thereafter, perform the converting the plurality of data on the plurality of images to the common characteristic in terms of luminance.

9. A non-transitory, computer readable storage medium containing a computer program, which when executed by a computer, causes the computer to perform an image display method by a display controller carrying out actions, comprising:

converting, via a plurality of combining-use conversion circuits, data on a plurality of images read from a memory to data having a common characteristic in terms of luminance, by mapping a luminance range of at least one of the images to a part of a luminance range of at least one other of the images;

performing, via a combining circuit, alpha blending after the conversion on the data on the plurality of images having the common characteristic that has been output from the combining-use conversion circuits; and outputting, via an output-use conversion circuit, data on a composite image as a signal for display to a display, wherein, prior to converting the plurality of data to the common characteristic in terms of luminance, the converting by the combining-use conversion circuits includes eliminating any nonlinear characteristic in the plurality of data for the plurality of images in terms of luminance, and thereafter, perform the converting the plurality of data on the plurality of images to the common characteristic in terms of luminance.

\* \* \* \* \*